United States Patent
Schmidt et al.

(10) Patent No.: US 10,791,525 B2
(45) Date of Patent: Sep. 29, 2020

(54) NON-ORTHOGONAL MULTIPLE ACCESS SIGNALLING IN LTE

(71) Applicant: IPCom GmbH & Co. KG, Pullach (DE)

(72) Inventors: Andreas Schmidt, Braunschweig (DE); Maik Bienas, Schoeppenstedt (DE)

(73) Assignee: IPCom GmbH & Co. KG, Pullach (DE)

( * ) Notice: Subject to any disclaimer, the term of this patent is extended or adjusted under 35 U.S.C. 154(b) by 0 days.

(21) Appl. No.: 15/759,065

(22) PCT Filed: Sep. 20, 2016

(86) PCT No.: PCT/EP2016/072300
§ 371 (c)(1),
(2) Date: Mar. 9, 2018

(87) PCT Pub. No.: WO2017/050760
PCT Pub. Date: Mar. 30, 2017

(65) Prior Publication Data
US 2019/0052309 A1    Feb. 14, 2019

(30) Foreign Application Priority Data
Sep. 21, 2015    (EP) .................................... 15186074

(51) Int. Cl.
*H04W 52/34*    (2009.01)
*H04J 13/00*    (2011.01)
(Continued)

(52) U.S. Cl.
CPC ........ *H04W 52/346* (2013.01); *H04B 17/336* (2015.01); *H04J 11/004* (2013.01);
(Continued)

(58) Field of Classification Search
CPC ............. H04W 72/042; H04W 52/143; H04W 52/346; H04L 5/0048
See application file for complete search history.

(56) References Cited

U.S. PATENT DOCUMENTS

2015/0312074 A1* 10/2015 Zhu ..................... H04L 27/2627
370/329
2017/0012754 A1*  1/2017 Sun ........................ H04L 5/0048
(Continued)

FOREIGN PATENT DOCUMENTS

EP           2983406 A1    2/2016
WO    WO-2014162819 A1    10/2014

OTHER PUBLICATIONS

International Search Report for International Application No. PCT/EP2016/072300, dated Dec. 12, 2016.
(Continued)

*Primary Examiner* — Marcus Smith
(74) *Attorney, Agent, or Firm* — Marshall, Gerstein & Borun LLP

(57) ABSTRACT

The present invention provides a method of operating a non-orthogonal multiple access, NOMA, communications network, the method comprising receiving from each of a plurality of user equipment, UE, devices at least one radio resource measurement report; processing the radio resource measurement reports to select a group of UE devices of the plurality of UE devices as a NOMA group; for the UE devices in the NOMA group determining a set of control parameters for the UE devices; informing the NOMA group UE devices a of the control parameters, wherein the control parameters are transmitted to the NOMA group UE devices using a downlink control information message having a format specific for NOMA messaging.

16 Claims, 7 Drawing Sheets

(51) Int. Cl.
  *H04W 24/10*  (2009.01)
  *H04W 72/04*  (2009.01)
  *H04L 5/00*   (2006.01)
  *H04J 11/00*  (2006.01)
  *H04B 17/336* (2015.01)
  *H04W 76/27*  (2018.01)
  *H04W 52/14*  (2009.01)
  *H04B 1/7107* (2011.01)

(52) U.S. Cl.
  CPC ........ *H04J 13/0003* (2013.01); *H04L 5/0037* (2013.01); *H04L 5/0048* (2013.01); *H04L 5/0053* (2013.01); *H04W 24/10* (2013.01); *H04W 72/042* (2013.01); *H04W 76/27* (2018.02); *H04B 1/71072* (2013.01); *H04W 52/143* (2013.01)

(56) References Cited

U.S. PATENT DOCUMENTS

2018/0255519 A1* 9/2018 Benjebbour .......... H04W 52/24
2018/0262288 A1* 9/2018 Gao ..................... H04J 7/00

OTHER PUBLICATIONS

Saito Yuya et al., "Non-Orthogonal Multiple Access (NOMA) for Cellular Future Radio Access", 2013 IEEE 77th Vehicular Technology Conference, XP032547855, ISSN: 1550-2252, Jun. 2, 2013.
NTT DOCOMO, "Candidate Non-Orthogonal Multiplexing Access Scheme," 3GPP DRAFT; R1-154535 NOMA SCHEME, vol. RAN WG1 No. Beijing, China; Aug. 24, 2015-Aug. 28, 2015, Aug. 23, 2015, XP051001806, URL: http://www.3gpp.org/ftp/Meetings_3GPP_SYNC/RAN1/DOCS/, Aug. 23, 2015.
ZTE: "Symbol Superposition Based Gray Mapping Scheme for Must to Be Captured in TR", vol. RAN WG1, No. Beijing China Aug. 24, 2015-Aug. 28, 2015, XP051001447, URL: http://www.3gpp.org/ftp/Meetings_3GPP_SYNC/RAN1/Docs/, Chapter 4, "Signaling Aspect", Aug. 23, 2015.
Huawei et al.: "PDCCH search space for SC-PTM transmission", 3GPP Draft; R2-153380 PDCCH Search Space for SC-PTM Transmission, 3rd Generation Partnership Project (3GPP), Mobile Competence Centre; 650, Route Des Lucioles, F-06921 Sophia-Antipolis Cedex; Franc, vol. RAN WG2, no, Beijing, China; 20150824-20150828, XP051004108: URL:http://www.3gppl.org/ftp/Meetings_3GPP_SYNC/RAN2/Docs/, Aug. 23, 2015.
EPO Office Action for Application No. 16 779 006.2, dated Apr. 17, 2019.

* cited by examiner

NON-ORTHOGONAL MULTIPLE ACCESS SIGNALLING IN LTE

CROSS-REFERENCE TO RELATED APPLICATIONS

This is the United States national phase of International Patent Application No. PCT/EP2016/072300, filed Sep. 20, 2016, which claims priority to European Application No. 15186074.9, filed Sep. 21, 2015, the entire contents of each of which are incorporated herein by reference.

FIELD OF THE DISCLOSURE

The present invention relates to the operation of an LTE (Long Term Evolution) mobile communication network and in particular signalling for implementing a non-orthogonal multiple access (NOMA) aspect of such a network.

BACKGROUND

Mobile communication is rapidly evolving. The success in connecting everything everywhere is posing formidable challenges to the mobile industry. The mobile broadband demand continues to grow exponentially. At the same time the proliferation of new types of devices and services is increasing both the number and types of connected devices that wireless systems have to deal with. More generally, these new types of devices will be serving a variety of new applications that provide new experiences and demand new forms of communication.

In order to address the expanding connectivity needs of the next decade 3GPP will soon start looking into plans for the standardization of next generation cellular technology, also known as "5G". One key aspect of these upcoming discussions is the definition of a next generation radio access technology, as this will be a key element to address the expanded connectivity needs of the future. Another key aspect is the evolution of existing E-UTRA radio access technology (i.e. the evolution of the existing LTE Uu air interface). In this context a new 3GPP study item was approved during RAN Plenary Meeting #68 dealing with superposition of users (cf. document RP-151100).

The E-UTRA air interface uses OFDMA for the downlink (i.e. for the transmission direction from the base station to the mobile terminal) and Single Carrier FDMA (SC-FDMA) for the uplink (i.e. for the transmission direction from the mobile terminal to the base station). It employs MIMO (Multiple Input Multiple Output) with for example up to eight antennas per base station and up to four antennas in the user equipment.

The use of OFDM enables E-UTRA to be much more flexible in its use of spectrum than the older CDMA based systems, such as UTRAN. OFDM has a link spectral efficiency greater than CDMA, and when combined with modulation formats such as 64QAM, and techniques as MIMO, E-UTRA is expected to be considerably more efficient than W-CDMA (Wideband Code Division Multiple Access) with HSDPA (High Speed Downlink Packet Access) and HSUPA (High Speed Uplink Packet Access).

A resource block (RB) represents the lowest granularity for scheduling a UE. In one configuration of LTE, a normal cyclic prefix (seven OFDM symbols per slot) and a sub carrier spacing of 15 kHz is used. That means with 12 sub carriers per RB, an RB spans over 180 kHz and has a duration of 0.5 ms.

In NOMA, several bit streams destined for different users can be transmitted in the same frequency band at the same time. For example, in an LTE system data transmissions to different users can be superposed in the same Resource Block (RB). Different signals are thereby only distinguished by different power levels, i.e. different signals are multiplexed in the power-domain. At the receiver multi-user signal separation is conducted based on successive interference cancellation (SIC). In detail, on the receiver side, while decoding user k, the decoder will delete the signals of users with higher transmission powers—for example users 1 to (k−1). The signals of the other users with lower transmission power levels—for example users (k+1) and above—will be simply treated as noise (from user k's point of view).

FIG. 1 depicts an example arrangement of three UEs that are residing in different distances d1, d2 and d3 from a base station (referred to in LTE as an enhanced NodeB or eNB) as well as their individual received signal power levels p1, p2 and p3 for normal transmissions (i.e. without superposition). For example, $UE_3$ receives p3=20%, $UE_2$ receives p2=30% and $UE_1$ receives p1=50% of the base station's maximum transmit power. According to NOMA principles the transmit power levels of all UEs will be adjusted accordingly for superposition of signals on the same radio resource by using, broadly speaking, the reciprocal value of the received signal power level, normalised by the sum of all reciprocal values of the received signal power, for example the following formula:

$$P_{Tx,i} = \frac{1/P_{Rx,i}}{\sum_{i=1}^{N} 1/P_{Rx,i}} \quad (1)$$

For $UE_3$ the transmit power will be weighted with a factor of 0.5, for $UE_2$ it will be weighted with factor of 0.3, and for $UE_1$ it will be weighted with a factor of 0.2 in the base station (the values obtained from equation (1) having been rounded).

In order for a NOMA communication system to work properly the following steps should preferably be performed:

1) Identify devices that are suited for superpositioning methods.
2) Form (a) group(s) of devices for superpositioning.
   a. What devices are suited (for grouping)?
   b. How many groups can be formed?
   c. How many devices can be assigned to a particular group?
3) Assign resources that are suited for superpositioning.
4) Provide channel gain (SNR) feedback information to the base station. For example, report the individual UE's RSRP or RSRQ values back to the base station for fractional transmit power allocations.
5) In the base station, determine
   a. MCS selection for NOMA resources
   b. fractional transmit power on downlink per user equipment (per group)
   c. validity period for the selected NOMA settings (if needed)
6) Transmission of the various data streams thereby using multiplexing in the power-domain according to the NOMA principles.
7) In the various mobile terminals, perform SIC operations to separate the multi-user signals, and continue with "normal" reception operations on each of the separated signals.

Such non-orthogonal transmissions allow multiple users to share the same radio resources without spatial separation, thereby improving the multi-user (MU) system capacity in the network.

If in step 7 above the UE has no knowledge about the power coefficients selected by the base station for NOMA transmissions in downlink direction, the UE would have to perform a Full Search on Multi-User Power Allocation (FSPA) for separating the multiplexed signals. In case of FSPA, multiple combinations of power allocations need to be considered for all candidate power sets that may have been chosen by the base station for the UEs in a given NOMA group. So, the number of power sets N to be searched becomes an optimization parameter. With a large number of power sets, the performance gains of NOMA increase. Unfortunately, at the same time, a large number of power sets require a lot of calculations/data processing on the receiver side. Thus, a large number of power sets is not desired in terms of energy consumption. Table 1 lists some example power sets for two UEs.

TABLE 1

| Number of power sets (N) | Example Fractional Power Allocations for two User Equipments (P1, P2) with P1 + P2 = P |
|---|---|
| 1 | (0.2 P, 0.8 P) |
| 2 | (0.15 P, 0.85 P), (0.2 P, 0.8 P) |
| 3 | (0.15 P, 0.85 P), (0.2 P, 0.8 P), (0.25 P, 0.75 P) |
| 4 | (0.1 P, 0.9 P), (0.2 P, 0.8 P), (0.3 P, 0.7 P), (0.4 P, 0.6 P) |
| 5 | (0.1 P, 0.9 P), (0.15 P, 0.85 P), (0.2 P, 0.8 P), (0.25 P, 0.75 P), (0.3 P, 0.7 P) |
| . | . |
| . | . |
| . | . |
| 50 | (nP, (1 − n)P) With n taking on values between 0.01 and 0.49 in steps of 0.01. |

NOMA is a new topic in 3GPP and as such it has not been discussed and evaluated in detail. So far, only preparatory discussions took place in RAN WG1 pertaining to physical layer properties. However, introducing NOMA in a future release of LTE will have some signalling implications as well. Any kind of signalling aspects for NOMA have not been discussed at all.

One of the relevant protocol layers for signalling is RRC (inherently vested with a small latency, but very reliable), another one is the PHY layer (quick, but not as reliable as RRC). The relevant signalling options in downlink direction (from tower to handset) are broadcast signalling (a signalling operation addressing all UEs in a given cell), multicast signalling (a signalling operation addressing only a sub set of UEs in a given cell) and dedicated signalling (a signalling operation addressing one particular UE in a given cell).

WO 2014208158 A1 appears to describe the basic operation of a NOMA network while WO 2015/029729 A1 relates to transmission power control in a NOMA network.

EP 2 983 406 A1 describes a NOMA network and signalling messages which may be used to implement this network. Channel state information is reported by user terminals and downlink control information including modulation and power schemes is transmitted using a downlink control channel. The downlink control information may be in the form of a matrix for all user terminals or may be separated into subbands.

Without signalling of the fractional transmit power allocation (FTPA), NOMA receivers have to perform a full search on multi-user power allocation. This is a costly procedure consuming processor resources and battery power. Generally, low power and low cost devices cannot at present benefit from NOMA as they have limited processor and battery resources that will not allow usage of such sophisticated methods.

GENERAL DESCRIPTION

The present invention provides various methods to inform UEs forming a NOMA group, i.e. UEs that use identical resources regarding frequency and time, about settings such as the FTPAs (i.e. the power coefficient settings) selected by the base station for NOMA transmissions in downlink direction on joint radio resources.

The present invention provides in one aspect a method of operating a non-orthogonal multiple access, NOMA, communications network, the method comprising receiving from each of a plurality of user equipment, UE, devices at least one radio resource measurement report; processing the radio resource measurement reports to select a group of UE devices of the plurality of UE devices as a NOMA group; for the UE devices in the NOMA group determining a set of control parameters for the UE devices; informing the NOMA group UE devices a of the control parameters, wherein the control parameters are transmitted to the NOMA group UE devices using a downlink control information message having a format specific for NOMA messaging. Preferred aspects of the invention are provided according to the dependent claims.

The present invention in a further aspect provides a base station, preferably an eNB, adapted to implement the base station aspects of the method of the invention and also a user equipment device adapted to perform the mobile terminal aspects of the method of the invention.

BRIEF DESCRIPTION OF THE DRAWINGS

The present invention will now be described, by way of example only, with reference to the accompanying drawings in which.

DETAILED DESCRIPTION OF PREFERRED EMBODIMENTS

Figure 1:
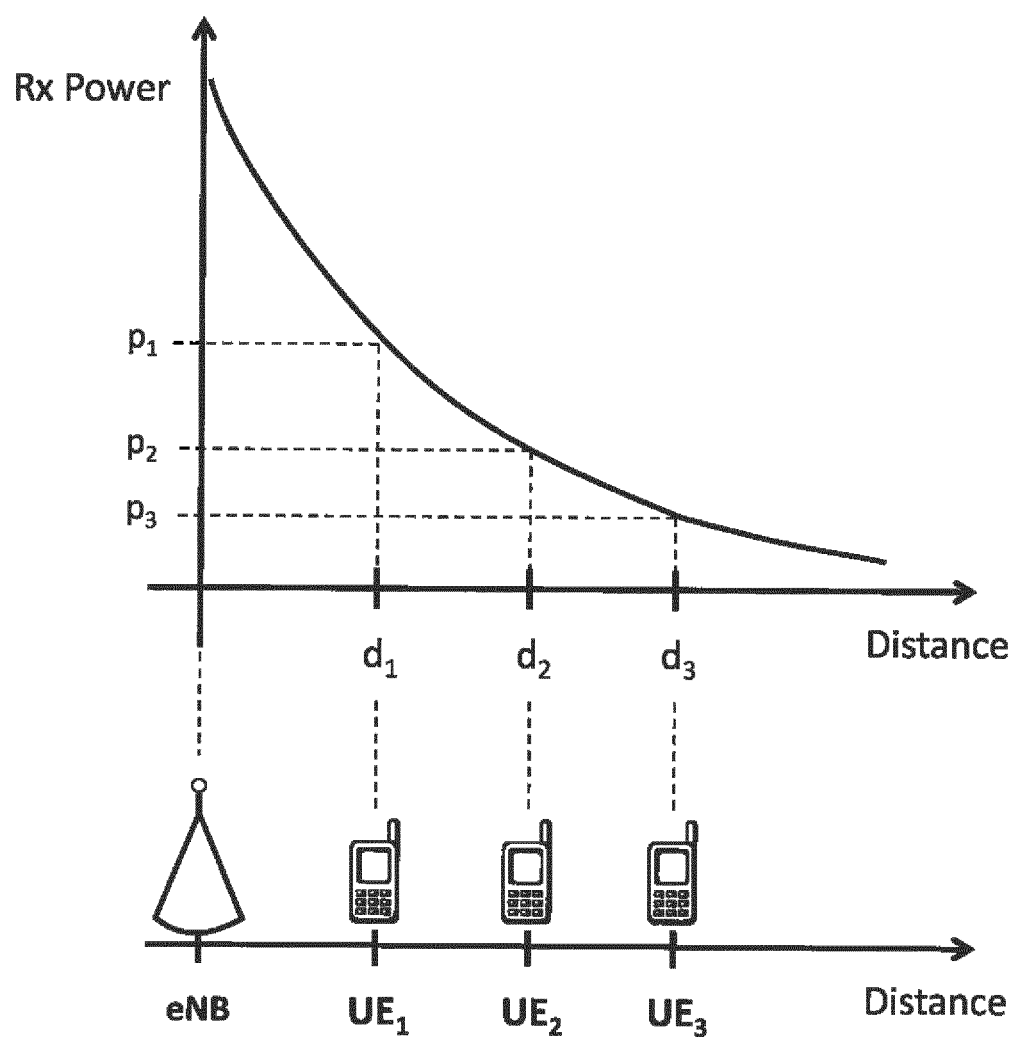
FIG. 1 shows a variation of reception power with distance from a base station for UE devices.
Figure 2:
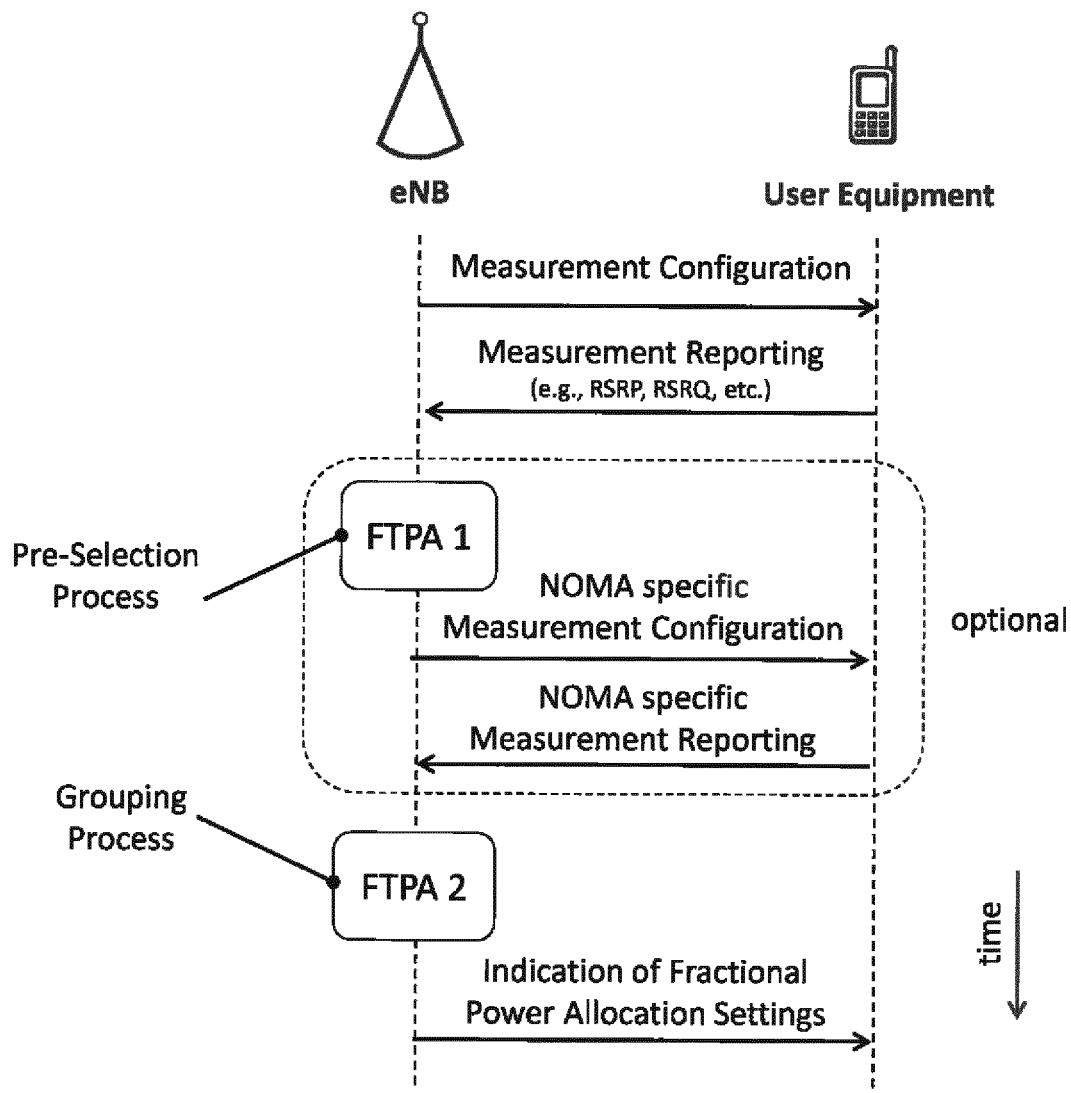
FIG. 2 a message sequence chart according to one embodiment of the invention.

In FIG. 2 a basic message sequence chart is shown for one embodiment of the present invention. First, each UE that is served by the eNB is configured with normal measurements for Radio Resource Management (RRM) purposes. For the sake of simplicity only one UE is shown in FIG. 2. From the NOMA principles it becomes clear that NOMA-related messages may be exchanged between the base station and multiple UEs (for instance, UEs that are potential candidates for superpositioning, or members of a specific superpositioning group). In this example measurements collected on neighbouring cells are ignored. Instead only those measurement results that were collected on the serving cell are considered as NOMA will be configured on this serving cell. For the channel gain measurements, Signal to Noise Ratio (SNR), Signal to Interference plus Noise Ratio (SINR), Reference Signal Received Power (RSRP) and/or Reference Signal Received Quality (RSRQ) are of particular interest in respect of the present invention.

The following steps deal with Fractional Transmit Power Allocation (FTPA). In one embodiment FTPA is a two-step approach consisting of pre-selection and grouping. In another embodiment FTPA is a single-step approach (without pre-selection).

In a pre-selection process FTPA 1 of FIG. 2, the eNB evaluates the "ordinary" measurement values (i.e. the regular measurements configured for Radio Resource Management (RRM) purposes) received from the various UEs aiming at pre-selecting UEs for superpositioning. The eNB may base its pre-selection decision(s) primarily on the channel gain measurement values received from various nodes. These processes are illustrated in an algorithm shown in FIG. 3 which shows steps performed by the eNB.

For a set of pre-selected UEs the eNB may choose to configure additional or alternative group specific NOMA measurements. For this, the MeasObjectEUTRA Information Element (IE) of the RRC protocol that is used in the MeasConfig IE may need to be adopted accordingly, for instance it could be enhanced with a new MeasConfigNOMA IE which is described in detail below. In doing so, it is beneficial to concentrate on those radio resources (e.g., resource blocks in case of LTE) that are destined for superpositioning. That means instead of (or in addition to) the collection of regular Reference Signal Received Power (RSRP) and/or Reference Signal Received Quality (RSRQ) values, the eNB may instruct the UEs to collect NOMA specific power level measurements on downlink radio resources (e.g., in case of LTE in resource blocks) that are supposed to be used jointly for superpositioning among members of a given group of UEs.

The MeasConfigNOMA IE could have the following form (written in the ASN.1 coding language):

```
-- ASN1START
MeasConfigNOMA ::=        SEQUENCE {
    carrierFreq               ARFCN-ValueEUTRA,
    physCellId                PhysCellId,
    MeasResourceBlocksListNOMA := SEQUENCE (SIZE (1..maxNumberRB)) OF MeasResourceBlocksNOMA
    MeasCycleNOMA ::=         ENUMERATED {sf160, sf256, sf320, sf512,
                                  sf640, sf1024, sf1280, spare1}
    MeasType                  ENUMERATED {AbsoulteRxPowerPerPRB, rsrp, rsrq,
ChannelGain},
    MeasResourceBlocksNOMA ::= SEQUENCE {
        PRB-Index             INTEGER (0..255),
        Slot-Index            INTEGER (0..maxSlot),
        SubFrame-Index        INTEGER (0..maxSubFrame),
        Frame-Index           INTEGER (0..maxFrame),
    }
}
-- ASN1STOP
```

UEs. For example, in such a way, that UEs with low channel gains are considered as "not suited" for superpositioning and UEs with medium to high channel gain as "well suited". Or in such a way that predetermined (e.g., absolute or relative) differences in the reported channel gains qualify certain UEs for applying superpositioning. In addition, the eNB may consider other input parameters received from UEs, Radio Access Network (RAN) nodes, and/or Core Network (CN)

Likewise, reporting of NOMA specific measurements can be configured additionally or alternatively to the regular reporting. For this, the ReportConfigEUTRA Information Element (IE) of the RRC protocol that is used in the ReportConfigToAddModList IE may need to be adopted accordingly, for instance it could be enhanced with a new ReportConfigNOMA IE which is described in detail below, again in the ASN.1 coding language.

```
-- ASN1START
ReportConfigNOMA ::=          SEQUENCE {
    triggerType                   CHOICE {
        event                         SEQUENCE {
            eventId                       CHOICE {
                NOMA1                         SEQUENCE {
                    Threshold1                    Threshold
                NOMA2                         SEQUENCE {
                    Threshold2                    Threshold
                },
            },
            hysteresis                    Hysteresis,
            timeToTrigger                 TimeToTrigger
        },
        periodical                    SEQUENCE {
            purpose                       ENUMERATED {StrongestCells, CGI,
OnNOMACellsOnly}
        }
    },
```

```
        triggerQuantity                           ENUMERATED {rsrp, rsrq, ChannelGain},
        reportQuantity                            ENUMERATED {rsrp, rsrq, ChannelGain},
        maxReportCells                            INTEGER (1..maxCellReport),
        reportInterval                            ReportInterval,
        reportAmount                              ENUMERATED {r1, r2, r4, r8, r16, r32, r64,
infinity},
        Threshold ::=              CHOICE{
            threshold-RSRP                        RSRP-Range,
            threshold-RSRQ                        RSRQ-Range
        }
-- ASN1STOP
```

The UEs behave accordingly and report NOMA specific measurements to the eNB (either in addition to or in lieu of the regular measurements).

Figure 3:
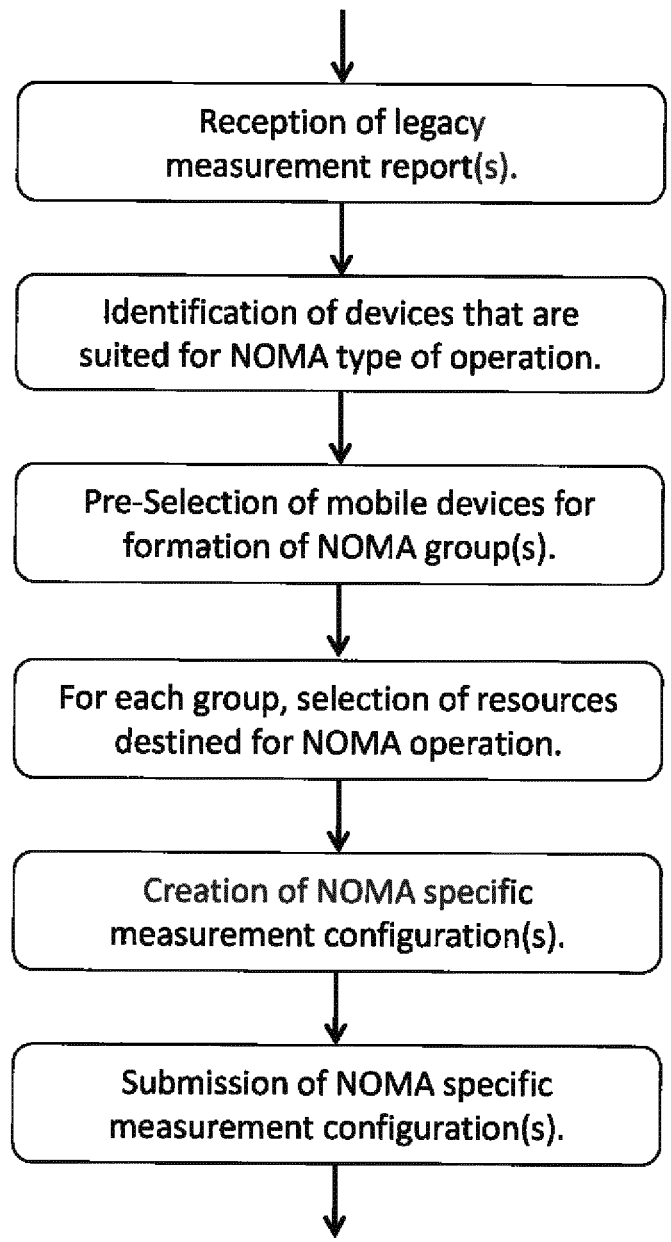
FIG. 3 shows a sequence of steps to be performed by an eNB implementing the invention.
Figure 4:
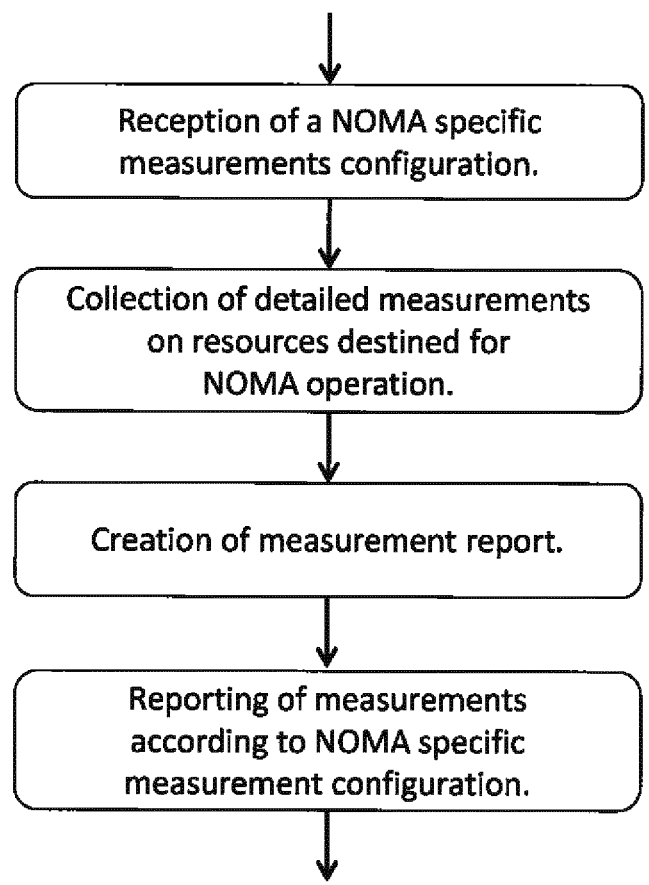
FIG. 4 shows a sequence of steps to be performed by a UE implementing the invention.

A detailed flow chart of the eNB's procedural steps that may be performed in context of the pre-selection of mobile devices for NOMA operation is shown in FIG. 3. Once configured with a NOMA specific measurement configuration, the UEs of a particular NOMA group are expected to collect NOMA specific measurements (that may be different compared to legacy measurements) according to its measurement configuration. A detailed flow chart of the mobile device's behaviour in response to a NOMA specific measurement configuration is given in FIG. 4.

For reporting of NOMA specific measurement results the MeasResults Information Element (IE) of the RRC protocol that is used in the MeasurementReporting RRC Message may need to be adopted accordingly, for instance it could be enhanced with a new MeasResultsNOMA IE which is described in detail below (expressed in the ASN.1 coding language).

```
-- ASN1START
MeasReportNOMA ::=           SEQUENCE {
    measResultNOMA               SEQUENCE {
        ChannelGainResults           ChannelGain-Range,
        rsrpResult                   RSRP-Range,
        rsrqResult                   RSRQ-Range
    }
}
-- ASN1STOP
```

In step "FTPA 2" of FIG. 2 the eNB is enabled to evaluate the measurement reports (that may comprise legacy measurement values as well as NOMA specific measurement values) received from the various UEs aiming at ultimately grouping UEs for superpositioning. The grouping decision(s) may be based on the same set of parameters as in the previous step, for instance on channel gain measurement values received from the various UEs and additionally on further input parameters received from UEs, Radio Access Network (RAN) nodes, and/or Core Network (CN) nodes. If NOMA specific measurement values have been received (e.g., triggered by the "pre-selection" function discussed above), the eNB has detailed knowledge about the reception quality on radio resources destined for joint transmission in the scope of NOMA, and may use these detailed measurement results for grouping decisions as well.

Once a group of UEs has been formed, fractional transmit power levels can be adjusted among group members so that multiplexing of individual data streams in the power domain can be performed according to the NOMA principles for transmission in downlink direction.

According to the present invention the eNB informs the members of a given NOMA group of UEs about the Fractional Transmit Power Allocation (FTPA) used for transmissions to this group of UEs. In doing so each NOMA group member gains knowledge about the power coefficients it has to use for de-multiplexing operations.

Figure 5:
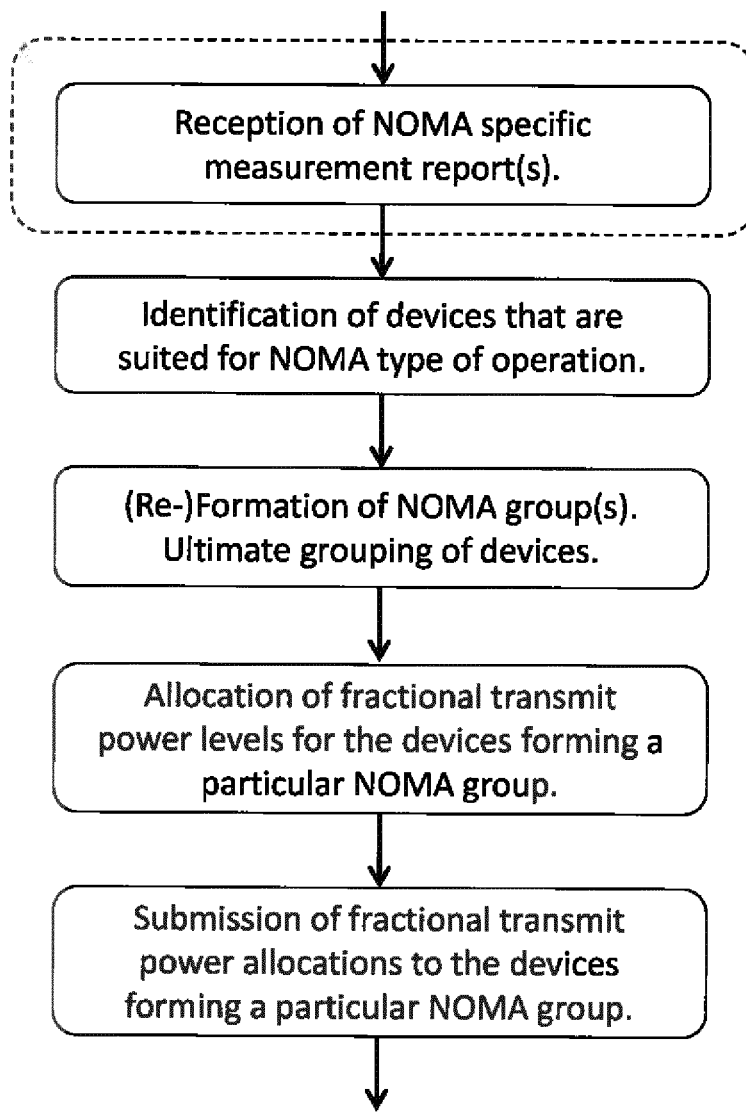
FIG. 5 shows a sequence of steps to be performed by an eNB implementing a further aspect of the invention.

A detailed flow chart of the eNB's procedural steps that may be performed in context of grouping of mobile devices for NOMA operation is shown in FIG. 5.

Figure 6:
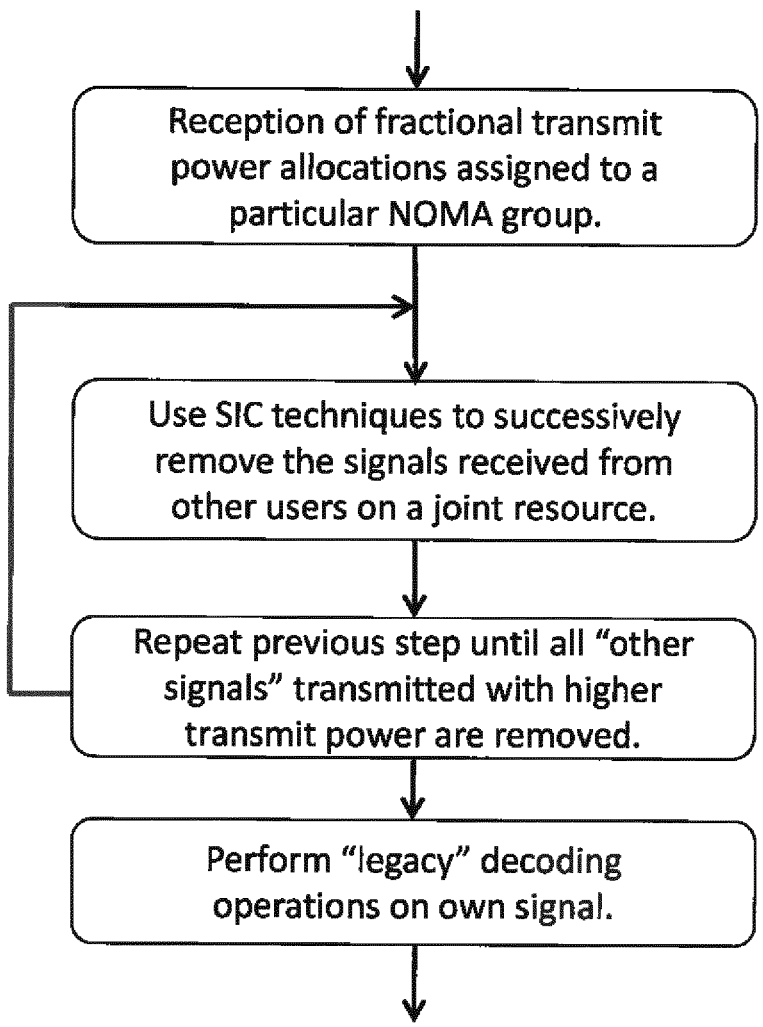
FIG. 6 shows a sequence of steps to be performed by a UE implementing a further aspect of the invention.

When the UE has received the Fractional Transmit Power Allocation (FTPA) information, it is expected to apply Successive Interference Cancellation (SIC) techniques to separate the multi-user signals received on joint resources (cf. FIG. 6). After that, it is expected to continue with legacy decoding operations of its own signal. In parallel it may continue with the collection and reporting of measurements as previously configured.

As the radio channel is a time variant channel, reception quality (or channel gain) may alter frequently. It is therefore preferable to:

(i) update the NOMA specific measurement configuration from time to time;
(ii) define triggers for NOMA specific measurement reporting or to report NOMA specific measurement periodically; and
(iii) include in the signalling from the eNB to the (group of) UE(s) information about the projected duration of the current Fractional Transmit Power Allocation (FTPA), a time limit, for example expressed in "number of sub frames", or similar.

In one embodiment of the present invention the periodicities for measurement configuration and/or measurement collection and/or measurement reporting may differ between "ordinary" measurements (i.e. those configured for Radio Resource Management (RRM) purposes) and "novel" measurements (i.e. those related to NOMA operation as discussed in the present document). In another embodiment of the present invention said periodicities may be aligned (e.g., one may be a multiple or a fraction of the other). In yet another embodiment of the present invention the above mentioned periodicities may be the same.

In one embodiment of the present invention all Fractional Transmit Power Allocation (FTPA) operations (i.e. pre-selection and/or ultimate grouping) are performed by the eNB, in another embodiment these operations are performed in an entity other than the eNB. Said entity may reside in the Radio Access Network (RAN) or the Core Network (CN) of the mobile communication system and it may be interconnected with the eNB.

Possible options for signalling for implementing such algorithms will now be described.

Enhancements to the RRC protocol (3GPP TS 36.331) for indication of NOMA power level settings are proposed in this invention.

In detail, we propose to define a new Information Element (IE) for use in the RRC protocol layer to allow indication of NOMA power level settings ("power coefficients") in downlink direction for at least one NOMA group. An example structure for this "NOMA Power Level Settings" container (that may comprise one or more further information elements for example arranged in a hierarchical manner) is given below (in the ASN.1 coding language):

```
-- ASN1START
NOMA-PowerLevelSettings ::=   SEQUENCE {
    NOMAgroupList   SEQUENCE (SIZE(1..maxNumberGroup)) OF NOMAgroup
}
NOMAgroup ::= SEQUENCE {
    GroupIdentifier   INTEGER(0..63),
    GroupControl      ENUMERATED {activation, update, suspension, termination,
...}
    PowerLevelList    SEQUENCE (SIZE(1..maxNumberUE)) OF PowerLevel
    Validity          ENUMERATED {sf1, sf2, sf4, sf8, sf16, sf32, sf64, sf128, ...}
}
PowerLevel ::= SEQUENCE {
    ue-Identity       ue-Identity,
    PowerRank         INTEGER(1..maxNumberUE},
    PowerCoefficient  ENUMERATED (0.1, 0.2, 0.3, 0.4, 0.5, 0.6, 0.7, 0.8, 0.9},
}
-- ASN1STOP
```

In this example structure, different power coefficients for up to "maxNumberUE" in up to "maxNumberGroups" may be assigned plus a validity criterion. The validity criterion may be optional. It may be used to indicate the validity of the signalled NOMA configuration (e.g., the remaining lifetime of the respective NOMA group as a whole, or the lifetime of the signalled power coefficient settings in this message for a given NOMA group that may exist beyond the indicated validity).

When a UE finds its UE-Identity in an instance of a PowerLevel IE, it knows that it has been made a member of the respective NOMA Group by the infrastructure side (eNB). It may then pick its individually assigned power level from the PowerCoefficient IE as well as its rank inside the respective NOMA Group from the PowerRank IE. The latter is useful for the receiving UE in the decoding process when Successive Interference Cancellation (SIC) operations need to be performed. This is done iteratively and every UE has to perform a different number of calculations based on its power rank. In this example a granularity of 0.1 was assumed for the power coefficients. Other steps sizes with a finer or coarser granularity are also thinkable.

The GroupControl IE may indicate whether the corresponding information/command for a particular NOMA Group is related to a new NOMA configuration (activation), a re-configuration (update), a pause (suspension), or the end of a NOMA operation (termination).

The example NOMA-PowerLevelSettings IE can be used in the RRC protocol layer either for broadcast dissemination (i.e. sent from the base station to all UEs residing in coverage of the cell) or for dedicated signalling (i.e. sent from the base station to one distinct UE) depending on the scenario.

For broadcast dissemination the mobile communication system's System Information Broadcast (SIB) mechanisms can be enhanced. For instance, a new SIB-Type may be defined for "NOMA Power Settings". The drawback with broadcast signalling is that the radio channel properties (e.g., the channel gain) might change quickly. System Information Broadcast (SIB) mechanisms are rather slow and might not be able to cater for fast changing channels. However, the benefit of broadcast signalling is that all UEs may be provisioned with all the information needed for successful NOMA decoding operations. And a UE involved in NOMA operations needs at least its own power revel plus those of the UEs being provisioned with higher power levels.

For dedicated signalling various RRC Messages that are sent in downlink direction, such as the RRCConnectionReconfiguration RRC Message (a command defined to modify an existing RRC connection) and alike, can be used (cf. 3GPP TS 36.331). The drawback with dedicated signalling is that several point-to-point connections need to be set-up and maintained. This might not be very resource and energy efficient in all cases. However, the benefit of dedicated signalling is that members of NOMA Groups may be informed reasonably fast and reliably about changes of the "NOMA Power Settings" that come along with fast changing radio channel properties.

The invention also provides for signalling at the physical level, in particular a PDCCH Indication. A new NOMA-DCI (Downlink Control Information) for indication of NOMA power level settings is proposed.

Figure 7:
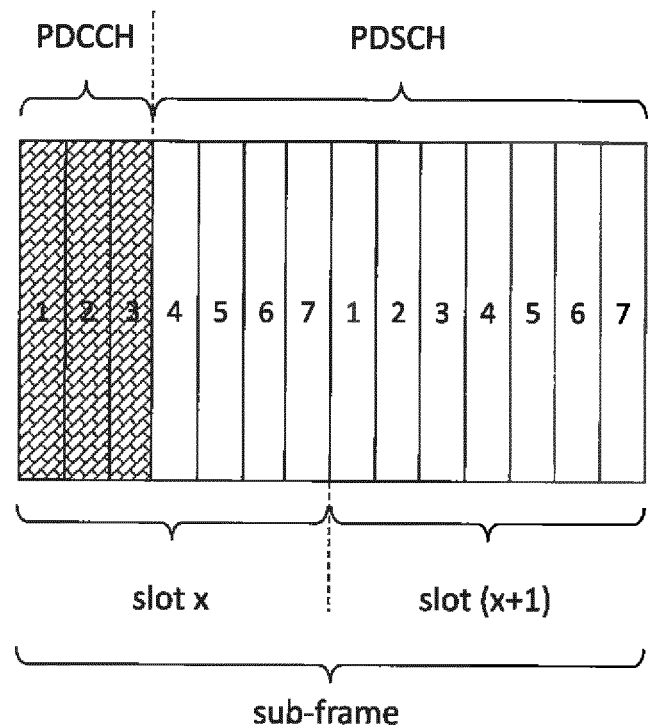
FIG. 7 shows a sub-frame structure.

In every LTE sub-frame the PDCCH (Physical Downlink Control CHannel) region precedes the PDSCH (Physical Downlink Shared CHannel) region. As the names imply, control data is transmitted in the PDCCH region while user data is transmitted in the PDSCH region. A symbolical representation of these two different physical channels is given in FIG. 7. One sub-frame (1 millisecond) consists of two slots. In the example of FIG. 7 each slot (0.5 milliseconds) consists of 7 OFDM symbols (in case of "normal cyclic prefix").

The characteristics of the PDCCH may be summarised as follows:

The PDCCH is mapped to the first L OFDM symbols in each downlink sub-frame. The number of the symbols (L) for the PDCCH can be 1, 2, or 3. The actual number of symbols for the PDCCH is specified by PCFICH (Physical Control Format Indicator CHannel).

The PDCCH carries Downlink Control Information (DCI). The DCI tells the UE how to get its data which is transmitted on PDSCH in the same sub-frame (this is named resource assignment). So DCI transmitted in PDCCH, is like a map for a UE to find and decode PDSCH from the resource grid.

The PDCCH also carries the "DCI 0" which is used for uplink scheduling assignments (e.g., the so-called "UL Grants").

Multiple PDCCH are supported and a UE monitors a set of control channels.

The Modulation Scheme for the PDCCH is QPSK.

Even though PDCCH has a lot of functions, not all of them are used at the same time, so PDCCH configuration is always applied in a flexible manner.

More details can be found in 3GPP TS 36.211.

In the context of resource assignment for the downlink the existing DCI give details about number of resource blocks, resource allocation type, modulation scheme, transport block, redundancy version, coding rate, and so on. Each DCI, when encoded, is attached with a CRC (Cyclic Redundancy Check) that is scrambled with the radio network temporary identifier, RNTI, of the UE the data on PDSCH is for. So, only that UE can decode the DCI and hence the corresponding PDSCH. The packed DCI information is the payload to the PDCCH encoding chain.

The existing DCI formats are further classified into downlink DCI formats and uplink DCI formats. The different DCI formats are as below:

Downlink DCI Formats

Format 1—Used for scheduling a PDSCH code word. Only a single transport block can be scheduled here using resource allocation type-0/type-1

Format 1A—Used for scheduling a PDSCH code word. Only a single transport block can be scheduled here using resource allocation type2 (localized or distributed). This one is used during Random Access.

Format 1 B—Used for scheduling a PDSCH code word with Rank-1 assignment

Format 1C—Very compact scheduling of a PDSCH code word. A single transport block can be scheduled using resource allocation type2 distributed always Format 1D—Used for scheduling MU-MIMO cases Format 2—Used for scheduling of PDSCH (DL Grant) in closed loop SU-MIMO Format 2A—Used for scheduling of PDSCH (DL Grant) in open loop SU-MIMO Uplink DCI Formats Format 0—Used for scheduling of PUSCH (UL Grant)

Format 3—Uplink transmit power control with 2 bit power adjustment

Format 3A—Uplink transmit power control with 1 bit power adjustment

The present invention employs a new DCI format for communicating NOMA specific control information such as NOMA power level settings. The DCI format belongs to the Downlink DCI formats and may look like this:

First Embodiment

Downlink DCI Formats

Format 4—Used for informing multiple UEs about NOMA power levels assignments.

Here, the content of the "NOMA Power Level Settings" container (defined above) is included in its entirety or in part as a special code word for this new DCI format.

Second Embodiment

Downlink DCI Formats

Format 1 E (or 2B)—Used for scheduling with superpositioning.

Here, a resource allocation and the allocated fractional power level used for the data transmission on the indicated resource are indicated to a UE in the same DCI instance.

Furthermore, a NOMA-RNTI is defined for the new DCI format discussed above (e.g., for new DCI Format 4). Only UEs that are capable of performing NOMA operations according to this invention would then be required to decode this new piece of DCI. Details about already existing RNTIs that are used in LTE, their hexadecimal encoding, and their usage can be found in 3GPP TS 36.321 section 7.1. For implementing the NOMA-RNTI, this could be assigned the hexadecimal encoding "FFF4" and its usage would be to provide an indication of NOMA power level settings.

It would also be possible to define more than one NOMA-RNTIs, for example NOMA1-RNTI which could be used to address members of a first NOMA Group and NOMA2-RNTI which could be used for a second NOMA Group. If multiple NOMA-RNTIs are assigned by the infrastructure side (eNB), NOMA-capable UEs can tell from the CRC check if the novel NOMA-DCI under investigation is destined for itself ("successful" CRC) or for another (group of) UE(s) ("unsuccessful" CRC).

Figure 8:
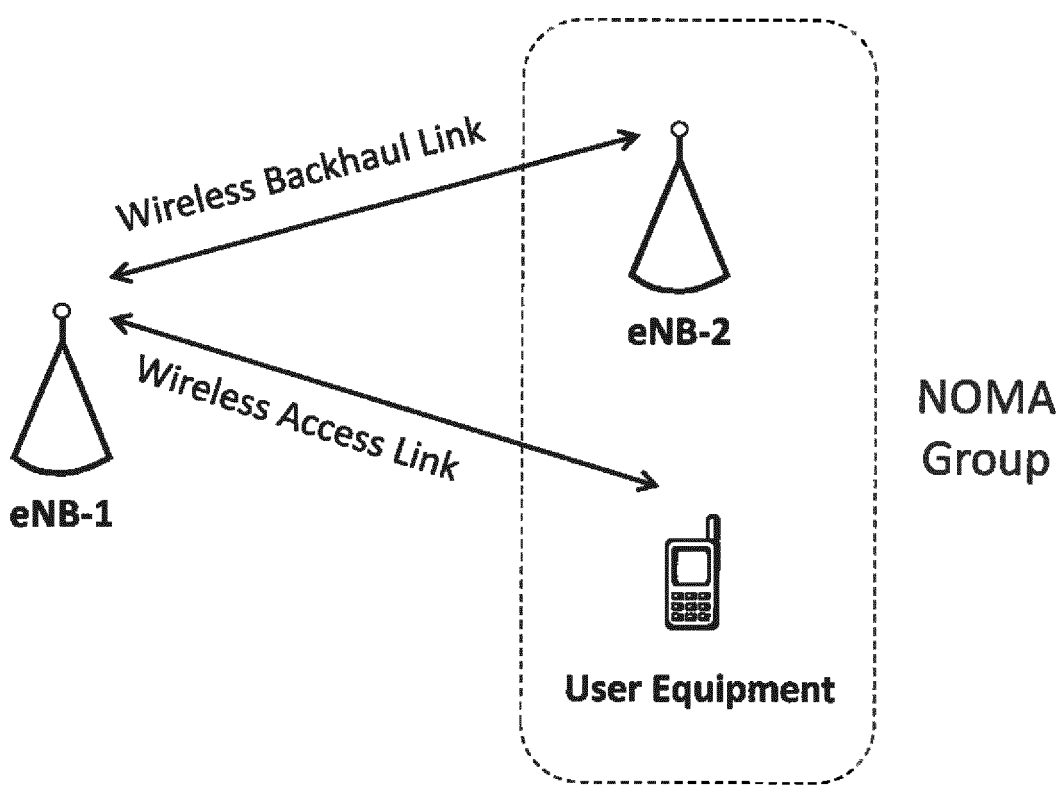
FIG. 8 an example NOMA group structure including fixed and mobile members.

For particular scenarios, a signalling mixture could be envisaged. A scenario in which a radio resource (e.g., a Resource Block as defined for LTE) is shared between a fixed infrastructure node and a mobile device (cf. FIG. 8) could be envisaged. In such a scenario two wireless links with different properties exist: one backhaul link between a first eNB and a second eNB that is almost static, and one access link between the first eNB and a UE that may be highly dynamic.

In this special case, one NOMA group member (here: eNB-2 with the almost static link) may benefit from receiving information about NOMA Power Level Settings in broadcast mode while the other NOMA Group member (here: the UE with the dynamic link properties) may benefit from receiving information about NOMA Power Level Settings in a dedicated fashion. This type of mixed signalling can for instance be used when the sum of both power levels used on the shared radio resource is below 100%, for example $P_{eNB-2} \approx 70\%$ (almost stable) and $P_{UE} \approx 10\% \pm 5\%$ (circling around a value of 10%).

The other way round is also possible: $P_{UE} \approx 75\% \pm 5\%$ (circling around a value of 75%) and $P_{eNB-2} \approx 10\%$ (almost stable). In this case, SIC operations would have to be performed by eNB-2 which can be assumed to have more processing capabilities and a stronger power supply.

The invention claimed is:

1. A method of operating a non-orthogonal multiple access, NOMA, communications network, the method comprising:
   receiving from each of a plurality of user equipment, UE, devices at least one radio resource measurement report;
   processing the radio resource measurement reports to select a group of UE devices of the plurality of UE devices as a NOMA group;
   for the UE devices in the NOMA group determining a set of control parameters for the UE devices;
   informing the NOMA group UE devices of the set of control parameters, characterized in that the set of control parameters is transmitted to the NOMA group UE devices using a downlink control information message having a format specific for NOMA messaging, the downlink control information message transmitted to the NOMA group UE devices being scrambled with a temporary identifier assigned to the NOMA group.

2. The method according to claim 1, wherein the downlink control information message has a format selected from one of a format used for informing multiple UE devices about control settings and a format for scheduling with superpositioning.

3. The method of claim 1, wherein the set of control parameters includes a set of fractional transmit power allocations for the UE devices.

4. The method according to claim 1, wherein the at least one radio resource measurement report contains information relating to at least one of:
channel gain estimation,
signal to noise ratio,
signal to interference plus noise ratio,
reference signal received power measurements, and
reference signal received quality measurements.

5. The method according to claim 1, wherein after a pre-selection of UE devices best suited for operation in a NOMA mode, such pre-selected UE devices are instructed to perform NOMA specific measurements on downlink radio resources.

6. The method according to claim 1, wherein transmit power levels of the members of the NOMA group are adjusted among the group members.

7. The method according to claim 1, wherein power allocation information is transmitted to the UE devices by means of a system information broadcast message.

8. The method according to claim 1, wherein power allocation information is transmitted to the UE devices by one or more radio resource control, RC, messages.

9. The method according to claim 1, wherein power allocation information is transmitted with the downlink control information, DCI, in a physical downlink control channel region of an LTE sub-frame.

10. The method according to claim 1, wherein transmit power allocation is performed by a serving E-UTRAN node B, eNB.

11. The method according to claim 1, wherein transmit power allocation is performed by an entity in the radio access network or the core network.

12. The method according to claim 1, wherein after UE devices have been assigned to a NOMA group, NOMA specific radio resource measurements are requested from the UE devices.

13. The method according to claim 12, wherein such measurements are to be made periodically.

14. The method according to claim 12, wherein such measurements are to be made event triggered.

15. The method according to claim 1, wherein a periodicity for configuring UE devices for NOMA specific resource measurements is aligned with a configuration of regular measurements for radio resource management purposes.

16. The method according to claim 1, wherein signalling is provided providing information about a projected duration of a current fractional transmit power allocation or a time limit for such allocation.

* * * * *